US008437725B2

(12) United States Patent
Brunel et al.

(10) Patent No.: US 8,437,725 B2
(45) Date of Patent: May 7, 2013

(54) DIGITAL INTERFACE BETWEEN A RF AND BASEBAND CIRCUIT AND PROCESS FOR CONTROLLING SUCH INTERFACE

(75) Inventors: Dominique Brunel, Antibes (FR); Laurent Noel, Quebec (CA)

(73) Assignee: St-Ericsson SA, Plan-les-Ouates (CH)

( * ) Notice: Subject to any disclaimer, the term of this patent is extended or adjusted under 35 U.S.C. 154(b) by 20 days.

(21) Appl. No.: 13/142,594

(22) PCT Filed: Dec. 29, 2009

(86) PCT No.: PCT/EP2009/009311
§ 371 (c)(1),
(2), (4) Date: Oct. 18, 2011

(87) PCT Pub. No.: WO2010/076021
PCT Pub. Date: Jul. 8, 2010

(65) Prior Publication Data
US 2012/0033720 A1    Feb. 9, 2012

(30) Foreign Application Priority Data
Dec. 31, 2008    (EP) .................................... 08368024

(51) Int. Cl.
*H04B 1/10*    (2006.01)
(52) U.S. Cl.
USPC ...................................... 455/296; 455/67.11
(58) Field of Classification Search ................. 455/296, 455/308–309, 310, 311, 226.1–226.4, 277.2, 455/278.1, 283, 67.11–67.16; 375/225, 227, 375/E7.154, E7.216, E7.233
See application file for complete search history.

(56) References Cited

U.S. PATENT DOCUMENTS

| 6,720,943 | B1 | 4/2004 | Kim et al. | |
|---|---|---|---|---|
| 7,136,418 | B2 * | 11/2006 | Atlas et al. | 375/225 |
| 7,376,117 | B2 * | 5/2008 | Erlich et al. | 370/343 |
| 7,558,348 | B1 * | 7/2009 | Liu et al. | 455/296 |
| 7,747,238 | B2 * | 6/2010 | O'Keeffe et al. | 455/309 |
| 8,019,382 | B2 * | 9/2011 | Rush et al. | 455/553.1 |

(Continued)

FOREIGN PATENT DOCUMENTS
WO    2006/027025 A    3/2006

OTHER PUBLICATIONS
PCT International Search Report, mailed Apr. 13, 2010, in connection with International Application No. PCT/EP2009/009311.

(Continued)

*Primary Examiner* — Lana N Le
(74) *Attorney, Agent, or Firm* — Potomac Patent Group PLLC

(57) ABSTRACT

Process for controlling the switching of the data rate at a digital interface exchanging data and control messages between a Radio Frequency (RF) circuit and a digital circuit, comprising the steps of: setting by default the data rate to a low speed (LS) rate having a density presenting a first lobe being inferior to the frequency band considered in said RF circuit so as to prevent desensitization of the LNAs by the noise produced by said digital interface; storing the data and control messages message into a FIFO and monitoring the level of said FIFO; whenever the level of said FIFO reaches a predetermined threshold value, then controlling said interface to switch to a second high speed (HS) rate in order to flush said FIFO. In one embodiment, the LS frequency is set to a value of 832 MHz, thus preventing simultaneously desensitization of the GSM band and also the GPS band.

20 Claims, 16 Drawing Sheets

U.S. PATENT DOCUMENTS

| | | | |
|---|---|---|---|
| 2003/0199249 A1* | 10/2003 | Cao et al. | 455/67.11 |
| 2005/0100076 A1* | 5/2005 | Gazdzinski et al. | 375/227 |
| 2006/0035594 A1* | 2/2006 | Murata et al. | 455/63.1 |
| 2006/0141946 A1 | 6/2006 | Rush et al. | |
| 2007/0286081 A1* | 12/2007 | Corazza | 370/236 |
| 2008/0214198 A1* | 9/2008 | Chen et al. | 455/67.11 |

OTHER PUBLICATIONS

PCT Written Opinion, mailed Apr. 13, 2010, in connection with International Application No. PCT/EP2009/009311.

* cited by examiner

Typical examples RF-BB chipset frequency bands of interest

| Operating Band | DL frequencies UE receive, Node B transmit | Maximum Allowable noise |
|---|---|---|
| I | 2110-2170 MHz | Maximum noise PSD: -181 dBm/Hz for 0.5 dB desense |
| II | 1930-1990 MHz | |
| III | 1805-1880 MHz | |
| IV | 2110-2155 MHz | |
| V | 869-894 MHz | |
| VI | 875-885 MHz | |
| VII | 2620-2690 MHz | |
| VIII | 925-960 MHz | |
| IX | 1844.9-1879.9 MHz | |
| X | 2110-2170 MHz | |
| XI | 1475.9-1500.9 MHz | |
| XII | 728-746 MHz | |
| XIII | 746-758 MHz | |
| XIV | 758-768 MHz | |
| GPS | 1575 MHz | Maximum Noise PSD: -184 dBm/Hz for 0.3 dB desense |

Fig. 4

| Victim | | Desensitisation margin | | |
|---|---|---|---|---|
| Standard | Operating frequency [MHz] | 832MHz with slew rate [dB] | 832MHz no slew rate [dB] | 1248MHz no slew rate [dB] |
| UMTS 700 | 737 | 30 | 23 | 15 |
| UMTS V | 880 | 26 | 20 | 12 |
| UMTS VIII | 940 | 25 | 17 | 11 |
| GPS | 1575 | 44 | 8 | 0 |
| UMTS I | 2140 | 20 | 0 | 0 |

Fig. 11

DIGITAL INTERFACE BETWEEN A RF AND BASEBAND CIRCUIT AND PROCESS FOR CONTROLLING SUCH INTERFACE

CROSS REFERENCE TO RELATED APPLICATIONS

This application claims priority under 35 U.S.C. §119 to European Patent Application No. EP 08368024.9, filed on Dec. 31, 2008, which is hereby incorporated herein by reference in its entirety.

TECHNICAL FIELD OF THE INVENTION

The present invention relates to digital communications and more particularly to a process for controlling the data rate on an digital interface between a RF circuit and an integrated base band circuit.

BACKGROUND ART

In mobile wireless equipment, the Radio Frequency (RF) transceiver and the baseband (BB) processor are often implemented on separate Integrated Circuits (IC). In such cases, the signal to be transmitted is transmitted from the baseband IC to the transceiver IC. Conversely, the received signal is transferred from the transceiver IC to the baseband processor. The transceiver IC normally contains analog signal processing, while the baseband IC shows to be predominantly digital. Therefore there are typically analog-to-digital and digital-to-analog conversions which take place in the receive and transmit paths respectively.

FIG. 1 illustrates a prior art example of a conventional block partitioning with analog IQ interface in a single antenna receive path, including an antenna 1, a filtering circuit 2, a RF transceiver 3, a baseband system 4, an RF isolator, a Power Amplifier (PA) power supply control scheme, and a PA bias control scheme. The use of an RF isolator is shown here purely as an example and is typically application specific. An isolator prevents the reflected RF power from returning to the PA output port and keeps other signals from getting into the PA output port.

Generally speaking, transceiver 3 includes analog signal processing circuitry while Base-band system 4 is fitted with powerful digital processing circuitry. Typically the analog signal processed by transceiver 3 are converted to or from digital form by a set of Analogue to Digital (A/D) and Digital to Analogue (D/A) converters respectively which, in the prior art example of FIG. 1 are located within Baseband device 4, in order to achieve the appropriate conversion of the analog signals into their digital representations and vice-versa. The exchange of IQ analog signals (each based on a differential set of wires in general) as well as the control signals including the clocks, the enable signals, and amplifiers control signals to tremendously increases the number of wires involved between the two packages. In the case of diversity receive path involving more than one antenna, the number of wires is further increased.

In the example of FIG. 1, the RF-BB interface requires as many as twenty interconnecting signals between the two chips for the antenna diversity case. This approach is currently in mass production with various semiconductor vendors for Enhanced General Packet Radio Service (EGPRS), Wideband Code Division Multiple Access (W-CDMA) (rel '99), High Speed Downlink Packet Access (HSDPA) and High Speed Uplink Packet Access (HSUPA applications).

The number of wires of an analog interface is further increased when considering the needs of the latest—and also future—developments of mobile digital communications with the advent of the latest 3GPP Long Term Evolution (LTE) features, increasing the data rate to an amount up to 100 Mbps. To achieve such values of data rate, an antenna diversity architecture is used involving a second radio receiver, further increasing the number of interconnecting wires and pins between RF transceiver 3 and baseband circuit 4.

The precise location of the A/D and D/A converters is a critical choice and dilemma for the designer of wireless mobile communication systems. Indeed, if the A/D and D/A converters are in RF transceiver 3, discrete time domain (digital) data is transferred across the interface between the baseband and the transceiver and, conversely, should the converters be incorporated within baseband device 4, then the interface would comprises continuous time domain (analog) signals.

More generally, the I/Q analog interface between RF circuit 3 and base-band circuit 4 face the following criticisms:
  The large number of interconnecting pins increases packaging cost,
  The large number of interconnecting signals complicates the design of the Printed Circuit Board (PCB) and final costs, especially when ground shielding is required for some wires;
  Reduces the possibility of having cooperation of different circuits manufactured by different vendors;
  Requires more effort in the design and redesign of the successive releases of the base-band digital circuit 4 because of the significant area of the analog blocks allocated in the integrated circuit. It has been observed, indeed, that it takes less time to design two successive releases of a pure digital integrated circuit than one circuit including a mix of digital and analog blocks.

It has thus been observed that moving analog cells into the RF circuit is likely to fasten the time to market by allowing digital design to migrate faster to a new CMOS process node, while analog cells may not shrink as much as the digital blocks into the most adequate CMOS digital process, thus being lower cost implemented in the process used for RF design.

For the reasons above, the latest trend consists in incorporating the A/D and D/A converters within transceiver 3 in order to suppress most of the analog circuitry within the baseband circuit 4 and thus facilitate the continuous development of successive releases of that circuit.

Furthermore, since the incorporation of most of the remaining analog components within the RF transceiver leads to a fully digital interface between both the transceiver 3 and the baseband device 4, there is given an opportunity to develop a standardized digital interface allowing easy communication between components designed and manufactured by different manufacturers.

FIG. 2 is an example of the implementation of a diversity receive path comprising antennas 11, filters 12, a RF transceiver 13 communicating with a baseband 14 through a purely digital interface 15. It can be seen that the A/D and D/A converters are now located within the RF transceiver 13.

Such architecture also has the significant advantage—also justifying the strong interest from the manufacturers—of decreasing the number of wires between the two systems because of the serialization/de-serializing process carried out at the level of the digital interface 15.

Such decrease of the number of wires clearly facilitates the design of and reduces the manufacturing costs of the components.

Generally speaking, the manufacturers of mobile wireless telecommunications products have initiated discussions and collective work for standardizing the digital interface between the RF transceiver and the BB deviceCombining the terms "digital" and "RF" together into the name "DigRF$^{SM}$", this interface is already in its third evolutionary step as listed in Table 1.

TABLE 1

DigRF version evolutions

| DigRF$^{SM}$ version | Standard | Interface bitrate (Mbit/s) |
|---|---|---|
| v2: 2G | GSM/GPRS/EDGE | 26 |
| V3: 3G | 2G + HSPA | 312 |
| v4: 4G | 3G + LTE | 1248, 1456, 2498, 2912 |

The more recent version of DigRF$^{SM}$ v4 uses a unified physical layer from M-PHY work group of the MIPI (Mobile Industry Processor Interface) consortium. DigRF$^{SM}$, leading to an improved digital interface based on only 6 physical wires interfacing RF and BB IC and allowing high level of programming abstraction to improve interoperability across vendors.

To the contrary to the analog interface wherein the data and the control were conveyed through different wires, the new DigRF digital interface caries data and control messages which are transmitted through one unique serialized pair of differential lanes. In TX, only one pair of differential lanes is used to carry both control and data message. Similarly, data messages are now digital symbols also being serialized.

In DigRF$^{SM}$, there are currently 4 interface speed clock frequencies being considered to latch the data onto the serial lanes:

2912 MHz, leading to 2912 Mbit/s transfer rate, referred to High Speed 2 (HS2)

2496 MHz, referred to High Speed 1 (HS1),

1456 MHz, referred to Low Speed 2 (LS2),

1248 MHz, referred to Low Speed 1 (LS1).

While the DigRF$^{SM}$ presents a significant improvement in the interface between RF and BB devices, there is still a significant problem to be considered.

Indeed, the use of the Digital Interface between both RF and BB systems entails the introduction of digital noise within an analog IC, and particularly in its most sensitive part: the Low Noise Amplifiers (LNA), thus adding additional noise which is likely to desensitize the receiver.

Indeed, a pair of DigRF$^{SM}$ line generate broadband white noise over several hundred of MHz, noise which is coupled into the LNA input pin(s) via electromagnetic coupling of the long bonding wires which can be modeled as radiating transmissions lines, acting in a fashion very similar to antennae.

The LNA sets the receiver chain added noise over thermal noise, commonly referred to the Noise Figure (NF). Due to its extremely low noise, it takes only very little added noise to degrade the RF receiver intrinsic noise floor. For example, assuming an RF IC with a 3 dB intrinsic NF referred to its LNA input pin (ie. an equivalent noise floor of −171 dBm/Hz at 25 degree Celsius), the maximum additional amount of noise being tolerable to degrade the intrinsic NF by 0.5 dB is as low as −180.1 dBm/Hz since −180.1+171=−170.5 dBm/Hz (equivalent to 3.5 dB NF). The lower the RF receiver intrinsic NF, the lower is the maximum tolerable noise for a given desensitization.

This relationship is summarized in FIG. 3 illustrating the radio receiver desensitization vs. a given additional white noise source power spectral density (PSD in dBm/Hz) for 4 different intrinsic NF: squares, NF=8 dB, diamonds, NF=6 dB, triangles, NF=4 dB, circles, NF=2 dB It can be seen that in the case of the GPS application with an intrinsic NF=2 dB, a 0.3 dB desensitization leads to a maximum additional white noise source PSD at the LNA input of −184 dBm/Hz.

FIG. 4 is a table which summarizes the maximum allowable noise for LNA depending on the different bands.

Clearly, the LNA most sensitive LNA is in GPS receivers since the signal is very low.

The observations below show how critical might be the introduction of additional noise resulting from a digital interface in the most sensitive parts of the analog circuitry, and particularly in the case of a GPS receiving path.

Some solutions are already known for limiting the effects of such additional noise.

A first solution consisting in carefully designing the LNA by systematically using differential wires in order to take benefit of the common mode rejection of such a differential architecture.

Furthermore the use of a sophisticated packages (eg. so-called flip chip package) for embodying the RF transceiver integrated circuit may reduce the coupling between the input wire of the LNA and the digital interface, which coupling generally increases with the frequency.

All those techniques clearly tend to increase the design and manufacturing costs of the transceiver IC.

In some situations, those techniques do not allow to avoid desensitization of the receiver in some circumstances.

In particularly, it has been shown that a 1248 MHz clock rate of the DigRF$^{SM}$ v4 interface desensitize the GPS receiver and gives very little margin for operating the LNA on bands above 1700 MHz.

The problem results from the fact that a high rate digital interface is introduced in highly sensitive analog circuits and the LNA therein included, which generates a significant amount of digital noise spoiling the low noise amplifiers.

This is the problem which is addressed by the invention.

SUMMARY OF THE INVENTION

It is an object of the invention to provide an enhanced digital interface between a RF circuit and a BB circuit, which provides better Electro Magnetic Immunity (EMI) to highly sensitive analog components, such as LNAs.

It is a further object to provide a process for controlling a digital interface between an analog RF circuit and a BB system which allows better performance of the LNAs therein located.

It is still another object of the present invention to provide an enhanced process for controlling a digital interface which shows superior performances with respect to EMI requirements in case of multiple band communications.

These and other objects are achieved by a process for controlling the switching of the data rate at a digital interface exchanging data and control messages between a Radio Frequency (RF) circuit and a digital circuit, such as a BB circuit, comprising the steps of:

setting by default the data rate to a low speed (LS) rate having a density presenting a first lobe being inferior to the frequency band considered in said RF circuit so as to prevent desensitization of the LNA by the noise produced by said digital interface;

storing the data and control messages message into a First In First Out (FIFO) and monitoring the level of said FIFO;

whenever the level of said FIFO reaches a predetermined threshold value, then controlling said interface to switch to a second high speed (HS) rate in order to flush said FIFO.

In one embodiment, the process involves slew rate control which is applied on the HS frequency of the digital interface in order to minimize the disturbance of the noise on the bands corresponding to the second and subsequent lobes of the spectrum of noise of said interface.

In one particular embodiment, the first LS frequency is set to 832 MHz, which shows positive effect on the first band (GSM) as well as the very sensitive GPS band, while the second HS frequency is set to 2496 MHz with application of slew rate control.

With a LS frequency set to 832 MHz, there is thus given the possibility to exclude desensitization of the FDD WCDMA, TDD WCDMA, TDS CDMA, LTE and Wireless LAN bands receivers.

In one particular embodiment, two distinctive bands are simultaneously received and the process performs a frequency hopping between said LS and HS speeds is controlled in response to the strength of the signals received in the two bands.

In one embodiment, the process involves a third (MS) medium speed for allowing frequency hopping between said first (LS), said second (HS) and said third medium speed (MS).

The process can be advantageously adapted in order to carry out a digital interface between a BB circuit containing RF blocks and a digital circuit of a display or a camera.

The invention also achieves a circuit for controlling the switching of the data rate at a digital interface exchanging data and control messages between a RF circuit and a digital circuit, comprising:

- a serializer/deserializer for serializing and dezerializing data and control messages exchanged at said interface;
- a FIFO buffer for received said serialized and deserialized data and control messages;
- means for setting by default the data rate to a LS rate having a density presenting a first lobe being inferior to the frequency band considered in said RF circuit so as to prevent desensitization of the LNAs by the noise produced by said digital interface;
- (mean to set LS frequency such that victim RF band close to the nul of the noise while not in the nul itself where it would be suffering from clock noise)
- means for storing the data and control messages message into said FIFO and monitoring the level of said FIFO;
- means active whenever the level of said FIFO reaches a predetermined threshold value, for controlling said interface to switch to a second high speed (HS) rate in order to flush said FIFO.

In one embodiment, the circuit applies slew rate control on the second HS LS rate so as to diminish the disturbance of the noise produced by said digital adapter in the band of frequencies corresponding to said second and subsequent lobes.

DESCRIPTION OF THE DRAWINGS

Other features of one or more embodiments of the invention will be best understood by reference to the following detailed description when read in conjunction with the accompanying drawings.

FIG. 4 shows a table which summarizes the maximum allowable noise for LNA operating in the different bands.

FIG. 11 is a table showing the improvement of the proposed solution on the desensitization margin.

DESCRIPTION OF THE PREFERRED EMBODIMENTS

There will now be described one embodiment of an improved digital interface between a RF device and a BB device which improves the EMI specification and provides the LNA with better immunity to the noise generated by the digital interface.

The example of the DigRF$^{SM}$ v4 will be considered, but the skilled man will straightforwardly adapt the teaching of the invention to future version of the DigRF or any other digital interface which is likely to spoil sensitive analog circuitries.

Figure 1:
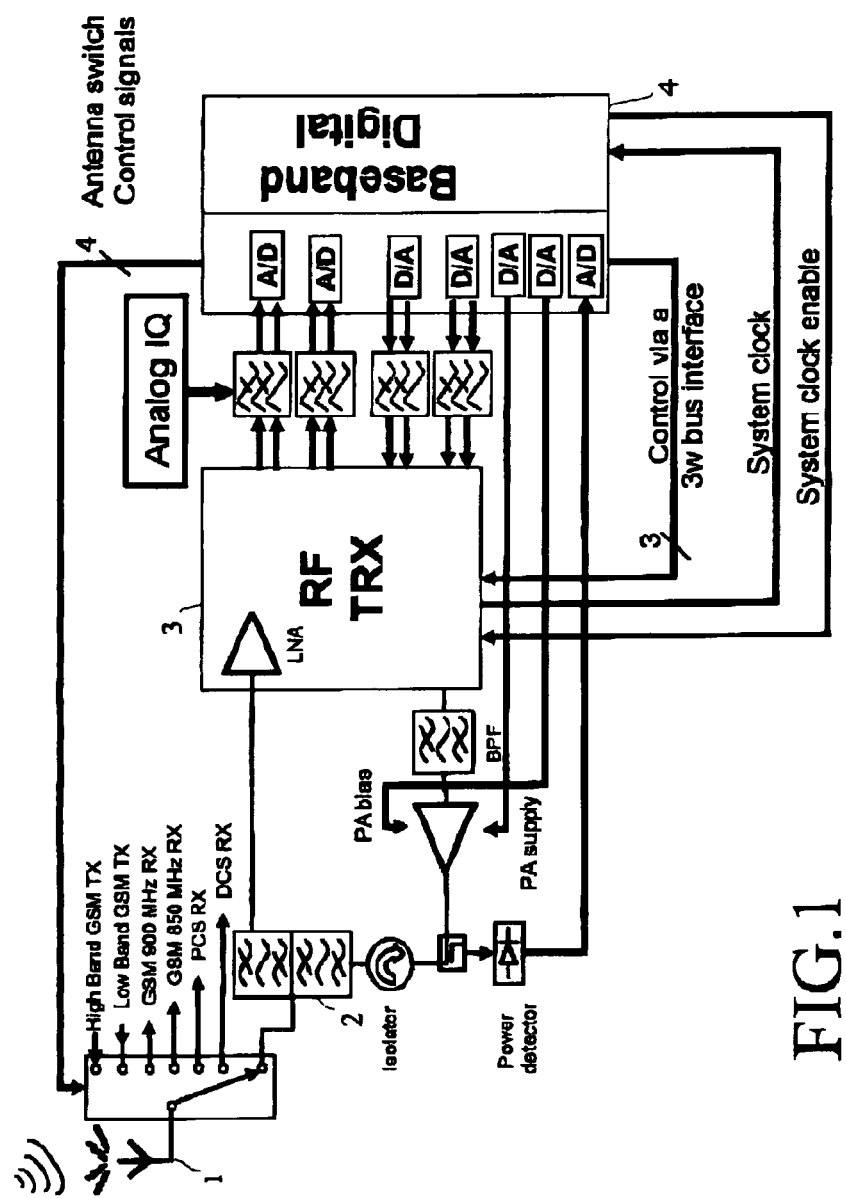
FIG. 1 illustrates a typical architecture of a single antenna receive path with an analog interface between the RF circuit and the baseband device.
Figure 2:
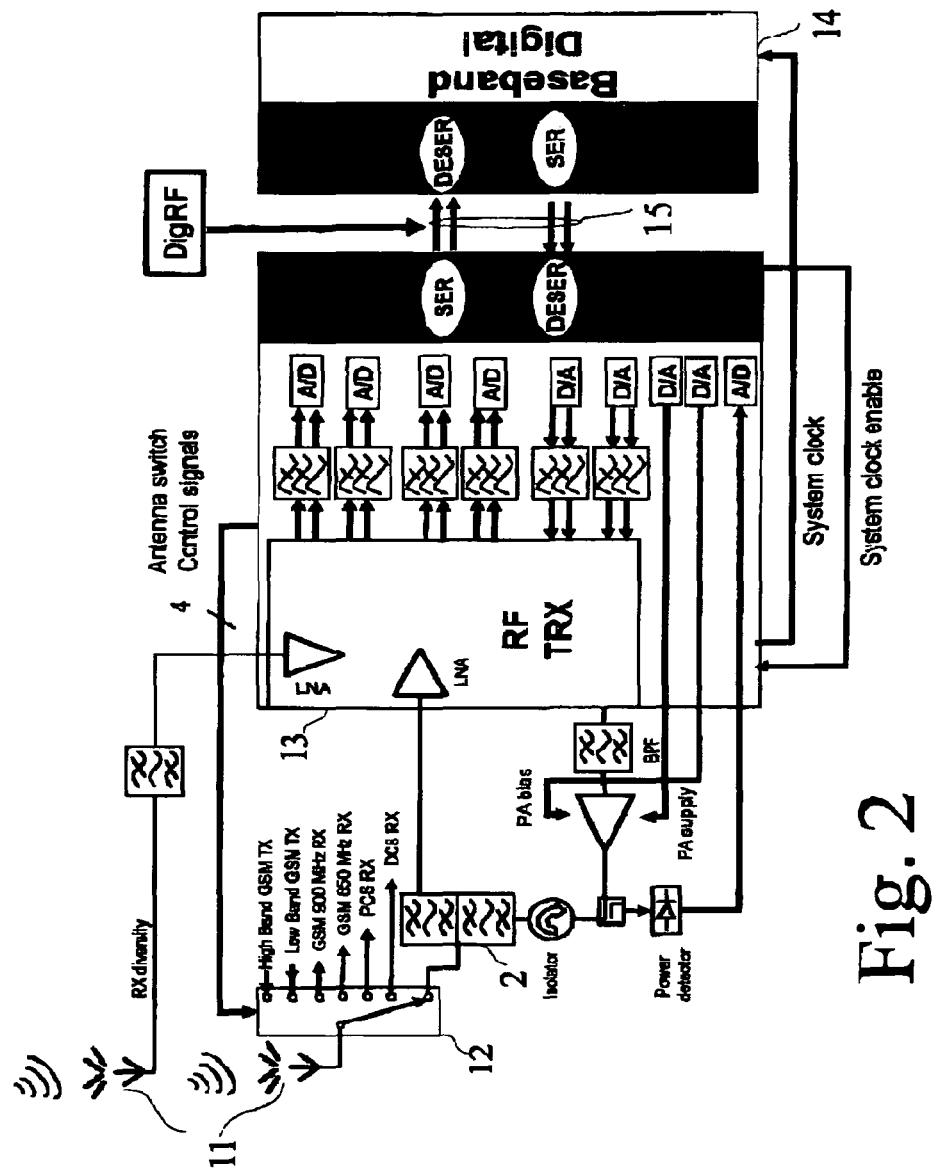
FIG. 2 illustrates a digital interface between the RF circuit and a baseband circuit in a diversity multiple antennas known receive path.
Figure 3:
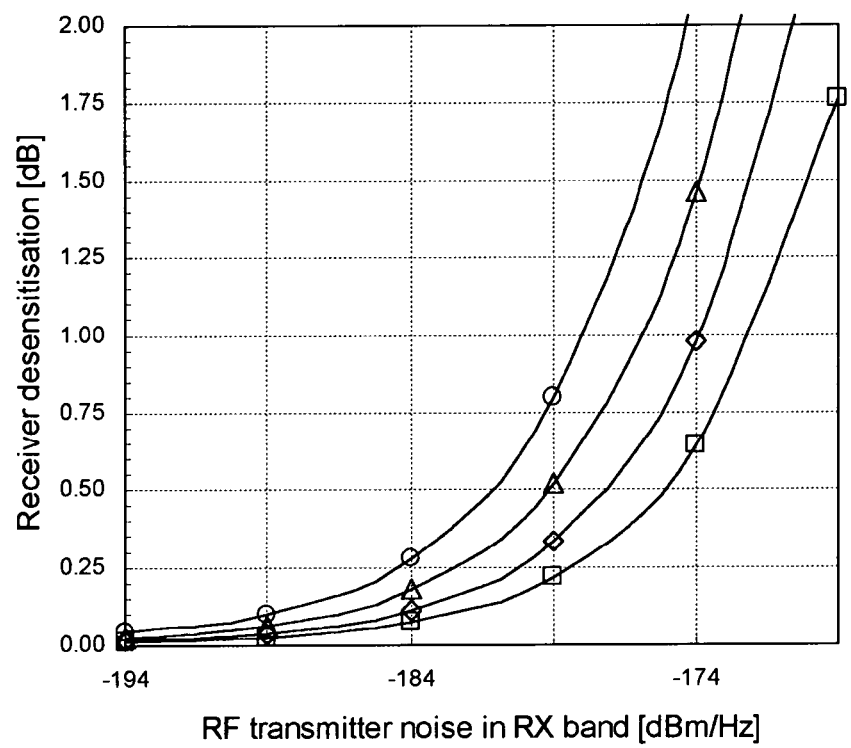
FIG. 3 shows the radio receiver desensitization vs. a given additional white noise source power spectral density (PSD in dBm/Hz) for 4 different intrinsic NF.
Figure 5:
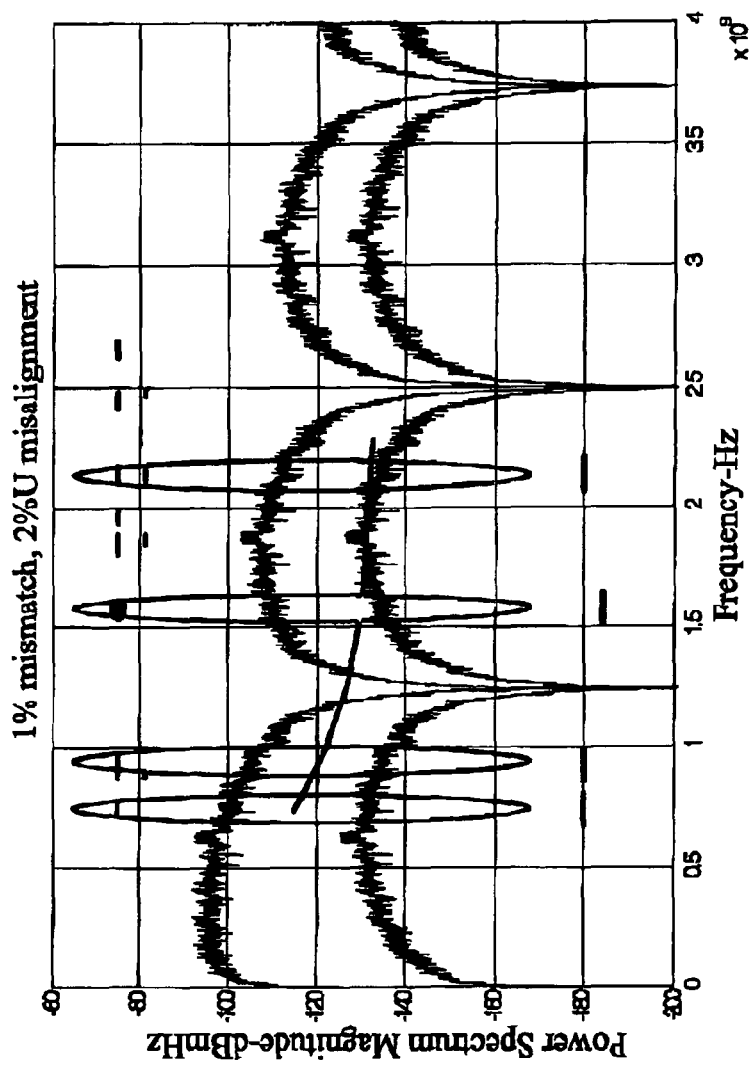
FIG. 5 illustrates the differential mode spectrum (top trace) and the common mode spectrum (bottom trace) of an 8b10b coding scheme used in DigRF v4 operating at a 1248 Mbps speed. Each victim's operating frequency band is illustrated at the top of FIG. 5 by a short horizontal segment, highlighted by an ellipse.

As known by the skilled man, the DigRF$^{SM}$ v4 standard takes advantage of a special bit coding scheme designed in the early 80's by IBM Corp., designated as the 8b10b coding ensuring that the DM spectrum shows no energy at DC (0 Hz) and presents a noise PSD as illustrated in FIG. 5 (top curve) for 1248 MHz clock frequency. It should be noticed that FIG. 5 takes into account a 1% amplitude and 2% Unit Interval (UI) time mismatch between the P and N line of the DigRF transmission lines. The Common Mode (CM) spectrum is illustrated in the lower part of FIG. 5.

It can be seen that a null is presented at the frequency at which the DigRF bus is being clocked, that is 1248 MHz in the considered example. The dashed black horizontal line showed on the FIG. 5 represents the maximum tolerable noise as summarized in the table shown in FIG. 4 (−181 & −183 dBm/Hz). The black continuous line illustrates the maximum allowable noise to meet the desensitization in each LNA bands.

In FIG. 5, the LNA's bands are illustrated using small square boxes at the top of the graph, GPS band being illustrated using a vertical black rectangle.

The amount of CM noise PSD (blue curve) below the black continuous line graphically illustrates the margin to avoid 0.5 and 0.3 dB RF receiver desensitization in cellular and GPS applications respectively. The CM noise PSD must be below this continuous line in order to allow proper operation.

Figure 6:
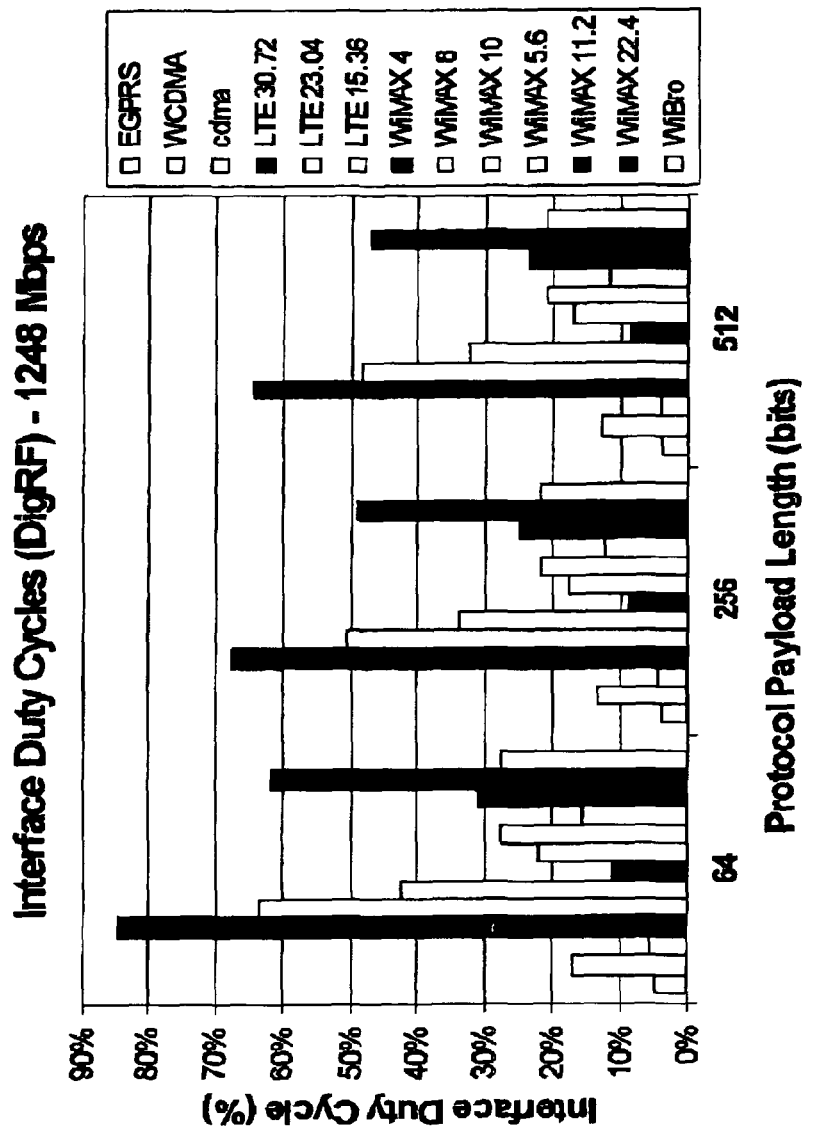
FIG. 6 shows the Interface Duty Cycles (DigRF) in the case of a 1248 Mbps digital Interface and in accordance with the Protocol Payload Lengths (bits).

FIG. 6 shows the Interface Duty Cycles (DigRF) in the case of a 1248 Mbps digital Interface and in accordance with the Protocol Payload Lengths (bits).

In DigRF$^{SM}$v4, the higher the interface clock rate, the higher the bandwidth for both data and control messages transfers. At a rate of 1248 Mbit/s, the bus bit rate is large enough to accommodate all standards, including the very demanding LTE 20 MHz (referred to LTE 30.72 MHz in FIG. 6). As the payload is increased, the duty cycle decreases since less protocol overhead is applied. It can be seen that with 1248 MHz, a diversity radio receiver solution can not be supported in LTE 20 MHz applications since the required duty cycling would exceed 100%. In this example, an additional pair of DigRF lane would be required.

It can also be seen the 1248 MHz clock rate desensitizes GPS LNA and furthermore gives very little margin in all cellular bands operating above 1700 MHz.

In DigRF applications, a difficult trade-off must be made between the bus bandwidth and the LNA desensitization. The higher the bit rate, the better the bus bandwidth and therefore the lower is the power consumption and the required number of lanes to accommodate a given standards, but this comes at the expense of a higher emitted noise and therefore the higher the radio receiver desensitization.

Figure 7:
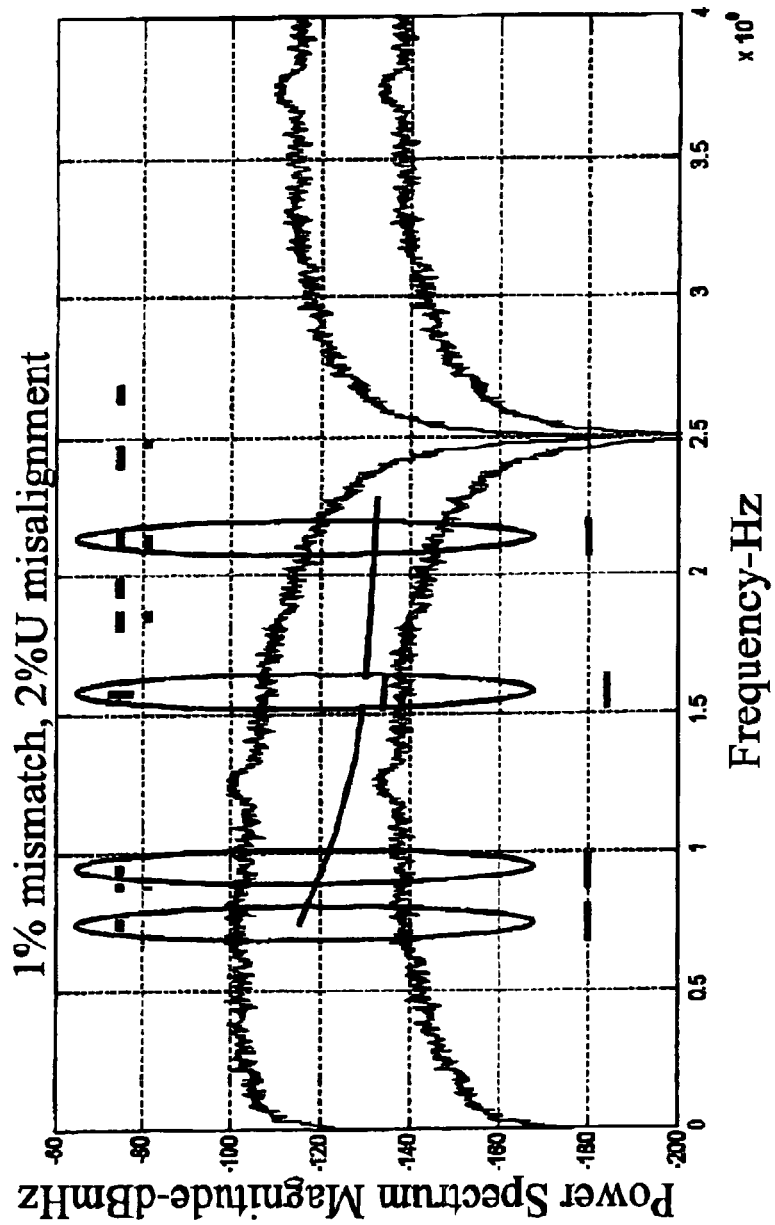
FIG. 7 illustrates the spectrum of a 8b10b coding scheme used in DigRF v4 operating at a 2496 Mbps speed.
Figure 8:
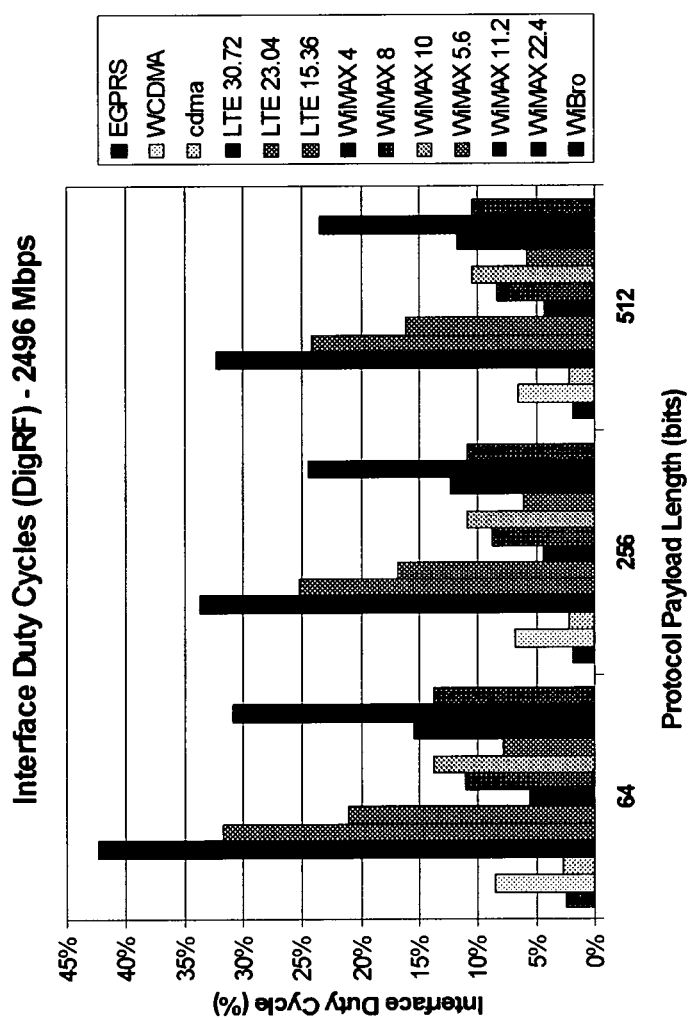
FIG. 8 shows the Interface Duty Cycles (DigRF) in the case of a 2496 Mbps digital Interface and in accordance with the Protocol Payload Lengths (bits).

This trade-off is further illustrated with the higher 2496 MHz clock rate of DigRF v4 as shown in FIGS. 7 and 8 for a 1% amplitude and 2% UI time mismatch respectively.

It can be seen that LNA desensitization can not be avoided as far as the GPS receiver is concerned.

In order to prevent LNA desensitization it is proposed to clock the digital interface between the RF circuit and the baseband circuit at two different speeds at least.

The first data rate is chosen to be a LS, which value may be set below the required duty cycle for operating the digital interface, but which provides optimal performance with respect to EMI requirements.

In order to prevent loss of data or control messages exchanged at the level of the digital interface when the latter is operated at a LS, a FIFO buffer mechanism is arranged.

In addition to the first speed, there is further provided a second, HS for complementing the first data rate in order to allow, at limited intervals a higher transfer of data throughout the digital interface for compensating, when necessary, the limited transfer provided by the first data rate.

A control unit provides control of the switching between the first, lower speed, data rate and the second, higher speed, data rate in order to, firstly, prevent desensitization of the LNA and, secondly, to achieve the transfer of data and control messages throughout the interface without suffering any loss.

Figure 16:
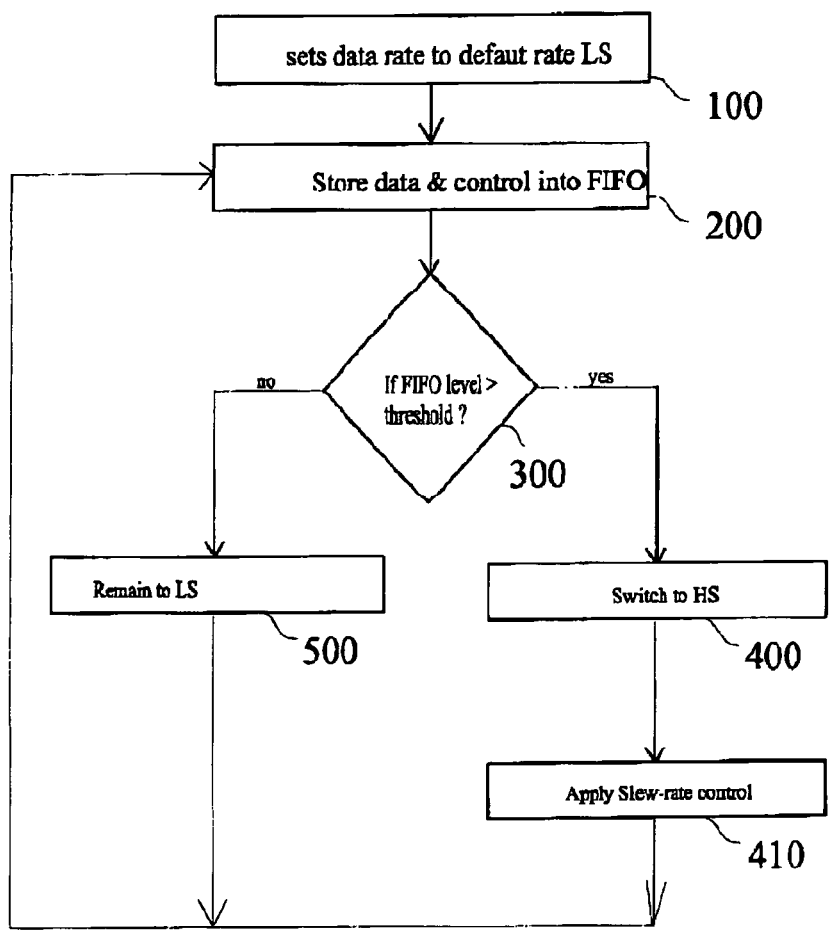
FIG. 16 shows the general flow chart of a process for controlling the speed of the digital interface

FIG. 16 illustrates more particularly the process for controlling the speed rate of the digital interface in accordance with one embodiment.

In a step 100, the process sets by default the data rate to a low speed (LS) which is chosen so as to present a first lobe being inferior to the frequency band considered in said RF circuit. This avoids desensitization of the LNAs by the noise produced by said digital interface.

Then, in a step 200, the process stores the data and control messages exchanged at the level of the interface into a First In First Out buffer.

In step 300, the process monitors the level of the FIFO and proceeds to a test in order to determine whether the level of data stored into FIFO has reached a predetermined threshold, in which case the process proceeds to step 400.

In step 400, the process switches the data rate to the second high speed data rate (HS) and then proceeds to step 410 where slew rate is applied in LS (and possibly in HS) in order to provide a particular profile to the clock transitions in order to avoid pure vertical rising and falling edges.

The process then goes back to step 200 to proceed further with the exchange of data.

If the test of step 300 shows that the level of the FIFO has not reached the predetermined threshold value, then the process proceeds to a step 500 where the low speed (LS) data rate is maintained, before the process goes back to step 200.

The invention is particularly suitable for a wide variety of applications and very flexible since both first and second data rate may be chosen in order to match specific requirements in accordance with the particular band of frequency being considered.

Two examples will be successively considered, in order to illustrate the versatile possibilities of the solution being proposed.

First Embodiment

In a first embodiment there is proposed to set the first lower data rate at a frequency minimizing the effects on the particular band being considered.

More particularly, it is proposed to provide a default data rate at a speed which is significant lower than the known DigRF$^{SM}$ data rates (1248-2912 MHz) and particularly 1 GHz, which default data rate shows a first lobe with a decreasing curve in the first bands of wireless mobile communications.

In one particular embodiment, it has been discovered that a data rate of 832 Mbps shows to be a very advantageous solution.

Firstly, there is a significant increase of the immunity of the LNA against desensitization. Indeed, as shown in FIG. 9 illustrating the spectrum of a 832 MHz digital interface with 8b10b (showing both Common Mode (CM) and Differential Mode (DM), there is arranged a zero near 700 MHz, thus reducing the noise in that particular band.

Figure 9:
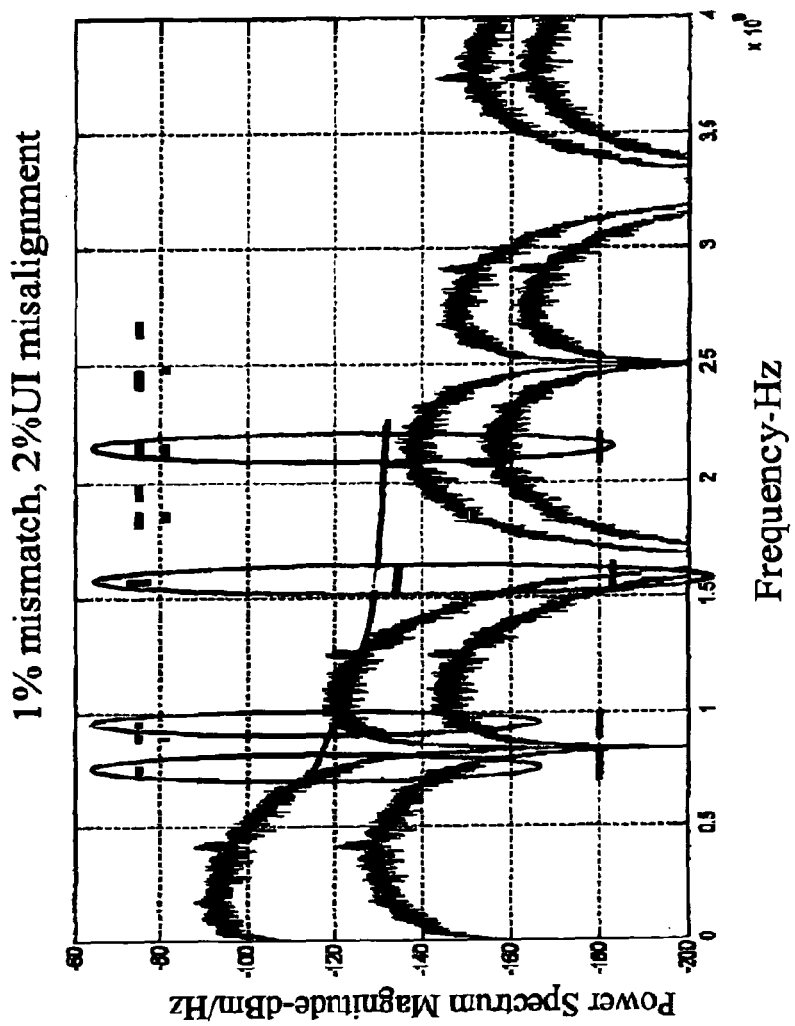
FIG. 9 illustrates the spectrum of the 832 MHz digital interface with duty cycle control, showing Common Mode (CM) and Differential Mode (DM) in accordance with a first embodiment.

Secondly, the value of 832 Mbps shows to be very advantageous because the GPS LNAs fall into the second lobe of the digital interface CM PSD spectrum as shown in FIG. 9. The PSD in this lobe can be further reduced by use of slew rate to control of the interface.

Thirdly, the value of 832 MHz can be easily generated by means of conventional frequency division techniques and particularly from the master 2496 MHz clock.

Fourthly, the value of 832 MHz is a bit rate low enough to allow using the interface in unterminated mode, which saves overall power consumption of the interface since power is no longer dissipated through the two 50 Ohm resistors. Also in the unterminated mode, the amount of radiated EMI shall be reduced since the amount of current flowing in each differential line is reduced.

Figure 10:
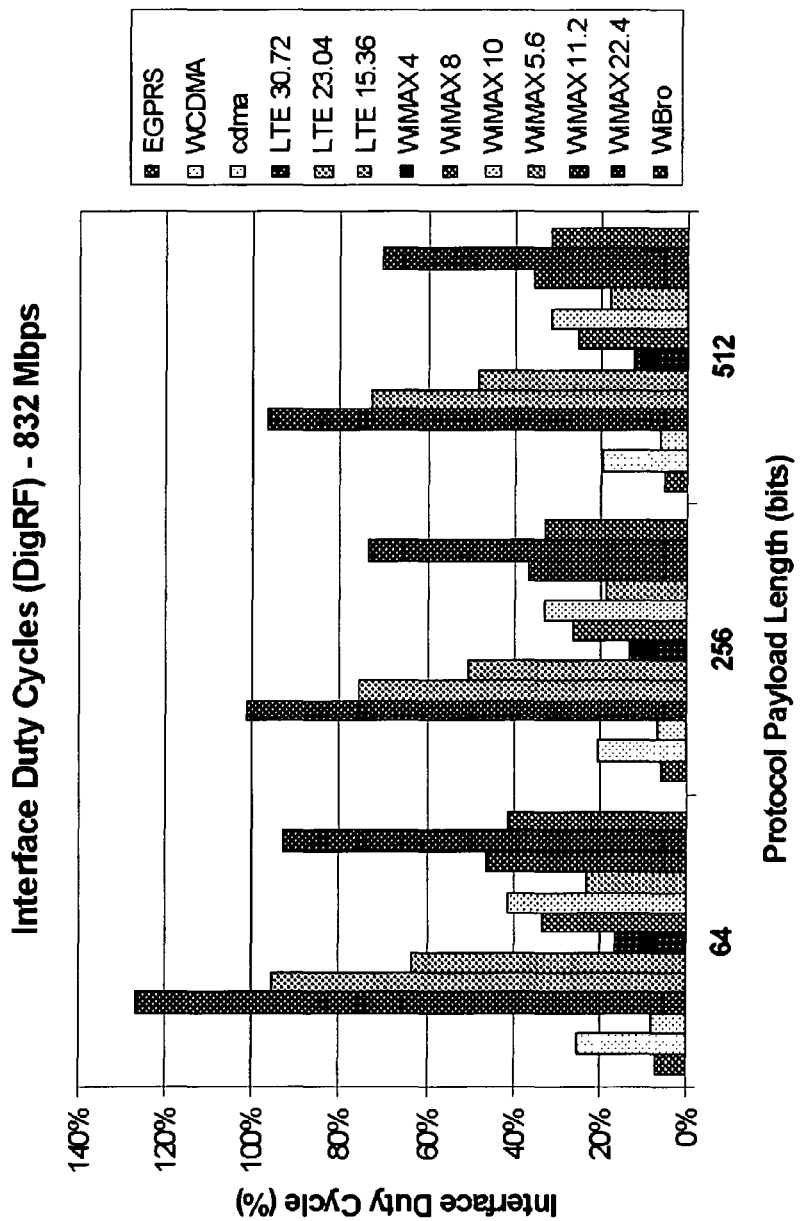
FIG. 10 illustrates the bus duty-cycle (%) vs. telecommunication standards of the first embodiment.

With respect to FIG. 10, the bus duty-cycle corresponding to the value of 832 Mbps for the different telecommunication standards is illustrated. It can be seen that, at least for LTE, the frequency of 832 MHz is not sufficient for providing full transfer of the data and messages involved in that standard.

This problem is solved by means of a second—higher—data rate operating at a higher frequency in order to allow, by means of the use of bursts, to speed up data transfer when this is necessary.

It should be noticed that a wide number of combination between the first—lower—and second—higher data rate are open and this shows the flexibility of the invention.

In one particular embodiment, the use of the second higher data rate is combined with a slew rate control applied on the clock transition on the digital interface in order to reshape the second and further lobes of the spectrum shown in FIG. 9.

It should be noticed that slew rate control is actually more effective in LS or MS modes than in HS modes for the reason that slew rate can only be applied to attenuate other lobes than primary lobe. In HS mode, the primary lobe overlaps nearly all frequency bands of operation where the cellular victims are commercially deployed. So slew rate control only helps for the very few telecommunication standards which operate in bands >2.5 GHz. While in either LS or MS mode, slew rate control is prime interest since it reduces the power spectral density of second, third, fourth etc. lobes, each one of them overlapping directly one or several victim's frequency bands.

With respect to FIG. 11, there is now illustrated a table showing the significant improvement on the desensitization margin on the LNA, considered as "a victim", resulting from the proposed 832 MHz clock rate with slew rate control against the standardized interface clock rate of 1248 MHz of the DigRF v4 standard.

The EMI reduction in the band of each LNA (victim) can be clearly seen. The use of slew rate control provides a very significant improvement as far as the GPS victim and UMTS band I are concerned, where the margin is now 44 dB and 20 dB respectively, as opposed to 0 dB in the case of the default DigRF v4 interface clock rate of 1248 MHz. This margin is so large that it provides designers with a significant flexibility in choosing either single ended or differential LNAs, as well as in pin allocation and choice of package technology.

From a bus duty-cycle and available bandwidth point of view, FIG. 10 shows that the bus can not support LTE 20 MHz for packet payload less than 1024 bits/payload. Ideally, the system requires a minimum 1024 bit long payload. A particular protocol may be used for that purpose in order to accommodate the delay associated with the use of 1024 bit long payload.

In order to support LTE RX diversity, there is further provided an additional pair of differential lines in the downlink direction, which is no drawback since this requirement is also imposed in the case of the default 1248 MHz DigRF v4 clock rate.

There will now be discussed one particular implementation of the mechanism allowing the control of the hoping between the said first (Low Speed LS) and the second (High Speed) frequency or rate.

The control mechanism of the frequency hoping is based on the monitoring of a First In First Out (FIFO) which receives the data and messages exchanged at the digital interface.

As soon as the FIFO buffer fills up and reaches a predetermined value and, the control means causes the switching of the digital interface to the HS speed in so as to flush the FIFO in a very short period of time in such a manner that the average desensitization meets our target desensitization budget of 0.5 dB, even using a low cost package, and a single ended LNA structure.

It should be noticed that different algorithms may be used for embodying such speed control mechanism and that the skilled man will straightforwardly choose one particular algorithm in accordance with the requirements and applications being considered. The algorithm is generic and can be tailored for a specific use case. The desensitization control algorithm is described with a limited set of 2 DigRF interface clock speeds, a LS and a HS mode in FIG. 12 below.

It should be noticed that, in some embodiment, the algorithm can be extended to a set of 3 or more clock speeds, for example Low-Speed (LS), medium speed (MS) and High Speed (HS), or even further combinations of frequencies. . . .

In order to illustrate the flexibility of the invention, an example is discussed with more details hereinafter, to accommodate the reception of LTE 20 MHz standard in the 700 MHz UMTS victim's band, using 832 MHz clock speed (LS) and 1248 MHz (HS).

The proposed LS frequency is selected to either position a null in the close vicinity of a LNA (victim) receiver band, or low enough so that the victim's receiver band is located at least in the 2nd lobe or a higher order lobe so that it can benefit from lower noise emission thanks to slew rate control.

Clearly, other set of frequencies may be considered.

Figure 12:
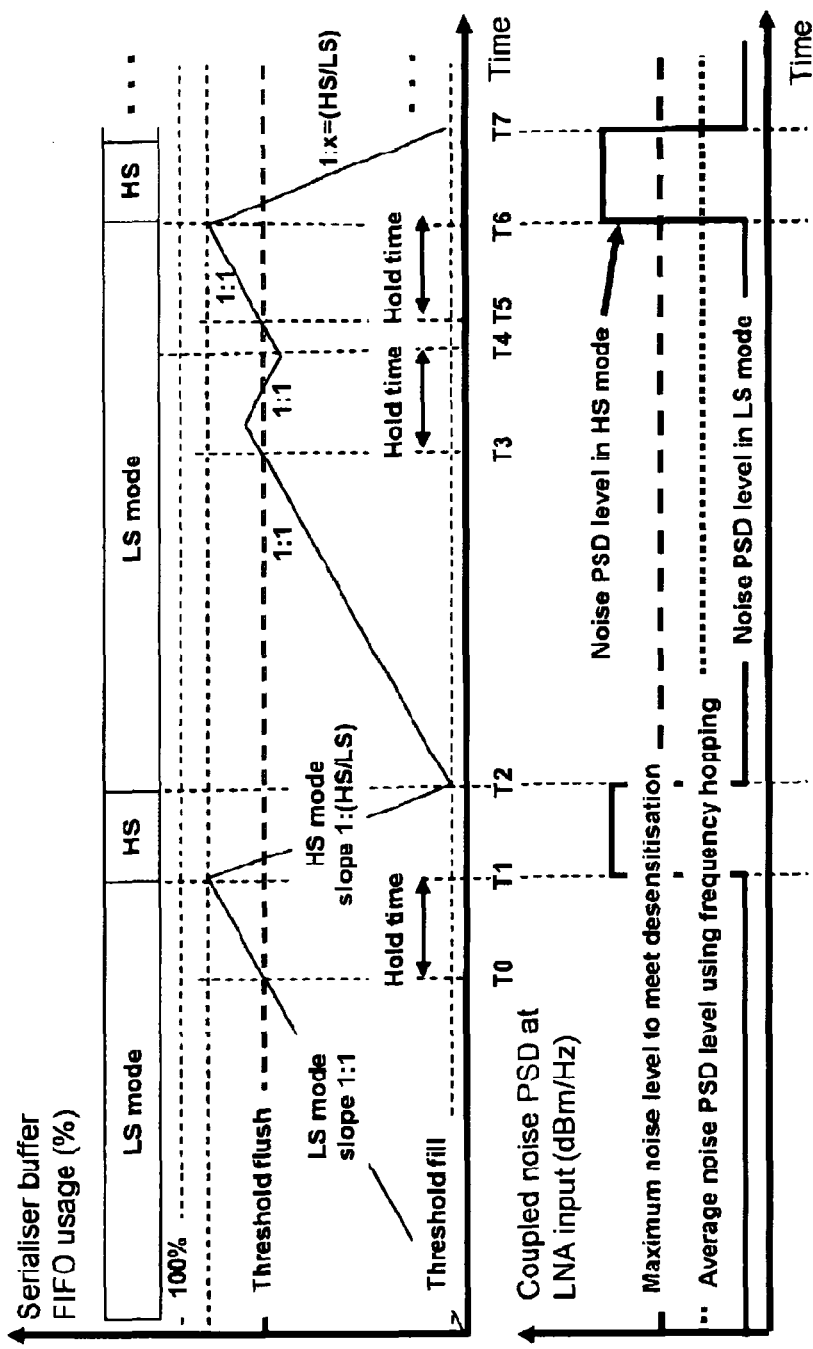
FIG. 12 shows a diagram illustrating the frequency hopping mechanism to reduce LNA desensitization

The top diagram of FIG. 12 illustrates the digRF interface serializer/deserializer FIFO expressed in percentage. In this diagram, it assumed that the DigRF bit rate in LS mode is not high enough, and that for the chosen standard or use-case, the duty-cycle requirements exceed 100%.

a FIFO "flush" threshold is used to indicate to the DigRF protocol stack that a change of interface speed may be required to avoid saturation of the FIFO, referred to "flush Threshold" in FIG. 12.

In one embodiment, in order to avoid oscillation of the algorithm, there can be advantageously arranged an hysteresis mechanism based on triggering a time counter for a length of time called "hold time".

At time To, a counter is triggered when the FIFO buffer size exceeds the "Flush Threshold" value, and the headroom margin to prevent reaching 100%. An example is provided in the following section, At time T1, after expiration of the counter, if the FIFO buffer state still exceeds the "Flush Threshold" value, a message is sent to the protocol stack to change the interface clock frequency to "HS" mode. The FIFO buffer empties itself at a rate "x" faster than it got filled, x being the ratio of interface clock frequencies, defined as x=HS frequency (MHz)/LS frequency (MHz), At time T2, the FIFO buffer size reaches a second threshold entitled "Treshold fill" to indicate to the protocol stack that the interface clock speed can now hop to the LS mode. The FIFO buffers fills itself at the rate of 1:1.

The hysteresis control is illustrated at time T3 and T4. At time T3, the "Flush Threshold" limit value is exceeded, the time counter is triggered. At time T4, the counter stops/expires. The DigRF v4 bus clock speed does not need to be hopped because at time T4 the FIFO buffer is in a state which is below the "Flush Threshold" value. Events between T3 and T4 where buffer size reduces is an example where radio receiver performs a handover from say LTE 20 MHz, to a standard which requires far less capacity on the bus (for example to perform a power measurement in the GSM standard), and then returns to LTE standard after the measurement is completed. The "Hold time" period prevents hopping too often to between LS and HS modes, and therefore reduces the amount of messages to be processed by the protocol stack.

Over time T5, T6 & T7, a similar pattern occurs to the time periods T0, T1 & T2.

The bottom graph of FIG. 12 illustrates the effectiveness of the scheme to protect the victim from being desensitized. The horizontal dashed line illustrates the maximum allowable noise that can be accepted by the LNA for a given desensitization budget. The plain line indicates the noise PSD vs. time of the algorithm. The dotted line indicate the long term average noise PSD over the time period required to either run a conformance test or to perform a voice call.

The interface is in LS mode at time <T1, T2<time<T6 etc. The LS mode is designed to ensure that the long term averaged associated radiated noise is below the desensitization noise budget for a given FIFO buffer size.

The interface is in HS mode at T1<time<T2 and T6<time<T7. Instantaneously, the radiated noise exceeds the maximum allowable noise, but over the time period of say a voice call, this PSD is averaged out to ensure no observable desensitization.

The algorithm attenuates the HS mode noise by a ratio equal to $10*\log[(T2-T1)/(T6-T1)]$. This ratio sets the minimum FIFO size for a given standard. Selecting an adequate combination of LS and HS mode is key to ensuring the desensitization noise budget is met for a given pin to pin package isolation, and a given LNA architecture.

It should be noticed that, and this is a substantial advantage of the present invention, the conventional state machine used for embodying the digital interface clock may be easily adapted in order to incorporate the teaching of the present application, based on a special stall state being created in which the HS PLL is maintained in the ON and LOCKED state, and allows toggling from one frequency divider to another to allow fast interface clock speed changes.

Example of the Algorithm Implementation.

This section illustrates the algorithm using a worst case scenario where the highest DigRF bus throughput is required, while the most sensitive victim (LNA), namely GPS, is activated. Let's apply the scheme to an application where:

the chipset must receive LTE 20 MHz (100 Mbit/s air interface rate) and GPS simultaneously, LTE is received in the UMTS 700 MHz band. This band is the worst victim for the system since it is located in the lowest part of the frequency spectrum, part at which the noise PSD of the DigRF interface reaches a maximum for the standardized clock rates. Refer to FIG. 5 for the 1248 MHz spectrum, and to FIG. 7 for 2496 MHz.

we assume a GPS intrinsic NF of 2 dB, a maximum "customer" tolerable desense of 0.3 dB (cf. table of FIG. 4), This sets a maximum allowable noise at the LNA input of −184 dBm/Hz—Refer to FIG. 5.

we assume a low cost packaging solution providing;
 −65 dB isolation at 700 MHz,
 −53 dB isolation at 1575 MHz (GPS band). . . .

Considering a DigRF v4 default interface clock speed of 1248 MHz, and let's analyse the available margins the system provides to the RF IC architect under various types of real life mismatches, such as amplitude and time delay mismatches. The problem is multi-dimensional, with 6 variables:
 Interface clock speed,
 Victim (LNA)'s band,
 Desensitization budget,
 Intrinsic radio IC NF,
 Differential line amplitude mismatch,
 Differential line delay mismatch, The result is the required CMR to meet the desensitization. The problem is summarized in 4 graphs attached to FIG. 13.

A first horizontal dashed line represents the minimum required CMR to meet the maximum allowed desensitization budgets, while a diamond mark represent experimental data collected with ideal test equipment and small time delay mismatches. The second horizontal dashed line indicates what would be required to reach a 6 dB safety margin. Preliminary feedback from the IC design community, is that less than 16 ps time delay mismatch at 1248 Mbit/s is not practically feasible. 20 ps is a realistic figure, which represents 2.5% UI. To provide designers with enough headroom, let's assume a 3 UI time delay mismatch budget, which provides a setup with an equivalent to −22 dB CMR in the GPS band. It can be seen in the bottom part of FIG. 9 that the system passes with an extremely small margin the required CMR of −21 dB for GPS. For mass production, this margin is not good enough. In other words, it can be seen from this graph that the 1248 MHz clock rate does not desensitize the GPS band only if an ideally matched pair of differential lines both in amplitude and time are used (0% UI time delay mismatch and <10% amplitude mismatch). Similarly, the UMTS 2100 MHz band requires very careful matching and design of the DigRF driver stages and PCB tracks to ensure CM EMI PSD does not desense the UMTS 2100 MHz LNA. Note that UMTS700 MHz victim benefits from large EMI budget, where desense is not an issue.

For this use-case, an application of the proposed algorithm consists in selecting 832 MHz clock rate as the LS mode to benefit from now placing the GPS victim band in the second lobe of the radiated EMI spectrum.

From and EMI point of view, it can be seen in FIGS. 9 and 10 that the selection of 832 MHz clock rate solves the EMI issues and provides with plenty of margin to avoid either using differential LNAs, or complicated and costly package technology: now with nearly −183 dBm/Hz, the system provides 40 dB of margin in the GPS band, nearly 30 dB in UMTS band I.

From a bus duty-cycle and available bandwidth point of view, FIG. 10 shows that the bus can not support LTE 20 MHz for packet payload less than 1024 bits/payload. Ideally, the system requires a minimum 1024 bit long payload. This is an issue from a protocol stack point of view which has been designed today to accommodate largest payloads of 512 maximum number of bits to meet time constraint scheduling tasks and round trip times inherent to the protocol ACK-NACK implementation of DigRF v4 under reasonable FIFO sizes. With the 512 bit long payloads, the 832 MHz clocking scheme can not support LTE 20 MHz, with a 102% is duty cycle bus load. Applying the algorithm presented for this patent application consists in using 832 MHz as long as a reasonable FIFO size allows it, and then hop to 1248 MHz for a short period of time to flush the FIFO.

Figure 13:
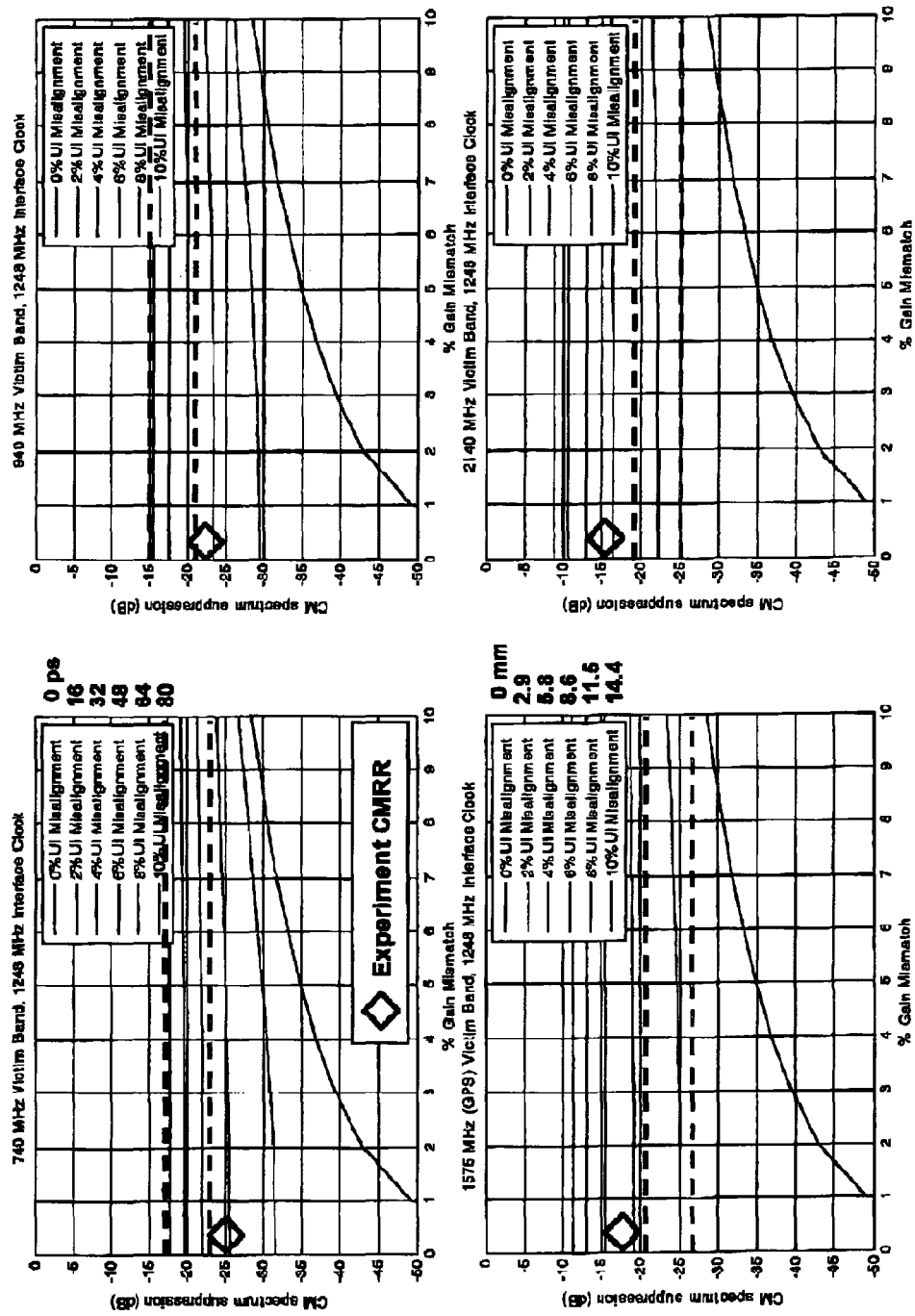
FIG. 13 shows the CM rejection for 1248 MHz EMI for the following applications: top left UMTS 700 MHz, top right UMTS 900 MHz, bottom left GPS, bottom right UMTS 2100 MHz, vs. amplitude, time delay mismatches
Figure 14:
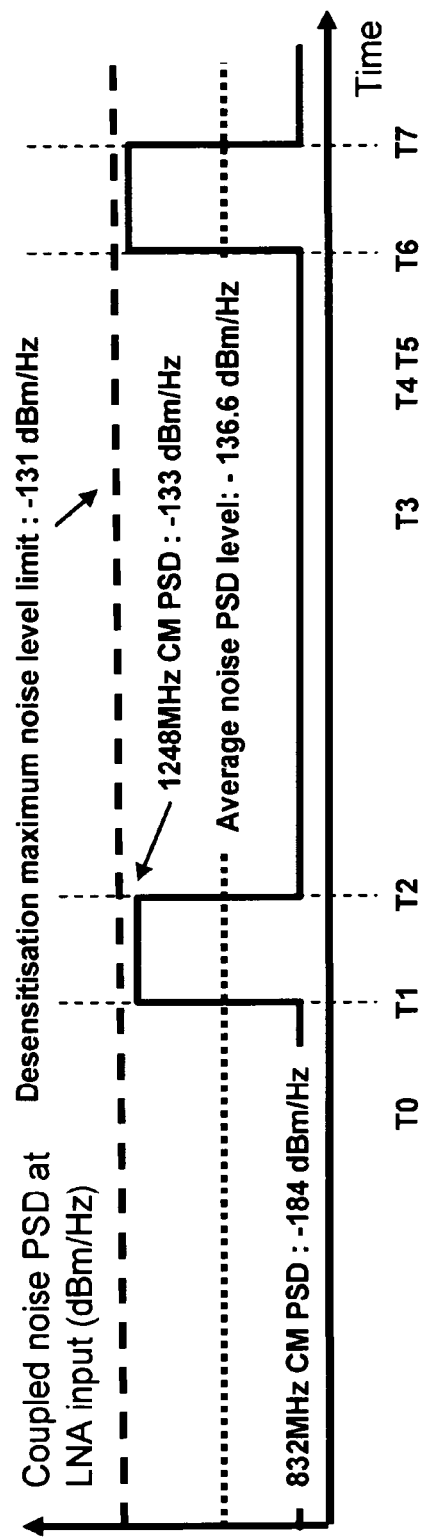
FIG. 14 illustrates the use of the solution based on the 832 MHz (LS) and 1248 MHz (HS) clock rate hopping to resolve GPS de-sensitization issue

The solution provides a comfortable 5 dB margin with an average generated CM PSD noise of −136.6 dBm/Hz as shown in FIG. 14 This represents nearly a 6 dB margin as targeted in FIG. 13 dotted lines. This improvement makes the system easier to implement. This solution is good enough for an application which does not make use of RX diversity in the LTE mode. If RX diversity is implemented, we know from FIG. 6, that neither 1248 MHz nor 832 MHz provide enough bandwidth to support diversity RX. An extra pair of RX lines are required. The noise generated by this extra pair will add up to the existing pair, in addition to the pair of differential lines also required for the uplink transmissions. In that case, the total added noise can be as high as 5 dB. With the 832/1248 MHz scheme, the resulting overall margin is only 1 dB. An alternative solution is proposed to support this particular scheme using 832-2496 MHz frequency hopping scheme.

FIG. 14 illustrates the use of the solution based on the 832 MHz (LS) and 1248 MHz (HS) clock rate hopping to resolve GPS desensitization issue In this figure, the following assumptions have been made:
Required maximum noise in GPS band: −131 dBm/Hz (−184 dBm/Hz+53 dB pin to pin isolation),
FIFO size sufficient to hold LS mode over 2 LTE timeslots, ie., 1 ms
Time is LS mode is held until FIFO size reaches 90% of its maximum size,
Out of the 832 and 1248 Mbit/s, 26 Mbit/s is reserved to implement control and ACK/NACK messages,
Slew rate control is used at 832 Mbit/s to lower the 2nd lobe CM PSD as shown in FIG. 9, ie. at −184 dBm/Hz in GPS band
From FIG. 13, the 1248 Mbit/s CM PSD is assumed to be −133 dBm/Hz under realistic differential mismatches of 5% amplitude mismatch and 3% UI time delay mismatch between P & N lines.
Target GPS maximum noise of −184 dBm/Hz,
512 bit long payloads, The FIFO size depends on the time period over which the LS, low noise mode is active, the headroom required to prevent FIFO to reach 100%. Let's assume a 10% safety margin on FIFO buffer size. This means that after expiration of the hysteresis counter, the FIFO will 90% of it maximum size. At 832 Mbit/s, if we assume 32 Mbit/s spare bandwidth for control messages as well as headroom for retransmission overhead through the ACK/NACK mechanisms, if the design wants to keep the noise low over 2 LTE slots, ie. 1 ms, then the FIFO size must be at least 100 kbyte. With this FIFO size, the system spends 0.65 ms in HS mode, 1 ms in LS mode, and an entire fill-empty FIFO cycle lasts 1.65 ms.

Another possible implementation is frequency hopping between:
LS mode=832 Mbit/s
HS mode=2496 Mbit/s Due to the smaller time at which the interface is in the 2496 Mbit/s mode, the noise emission improvement is increased, as shown in FIG. 15 where the average noise PSD in the GPS band is now reduced to −144.6 dBm/Hz, a 13 dB margin from the system requirements.

Figure 15:
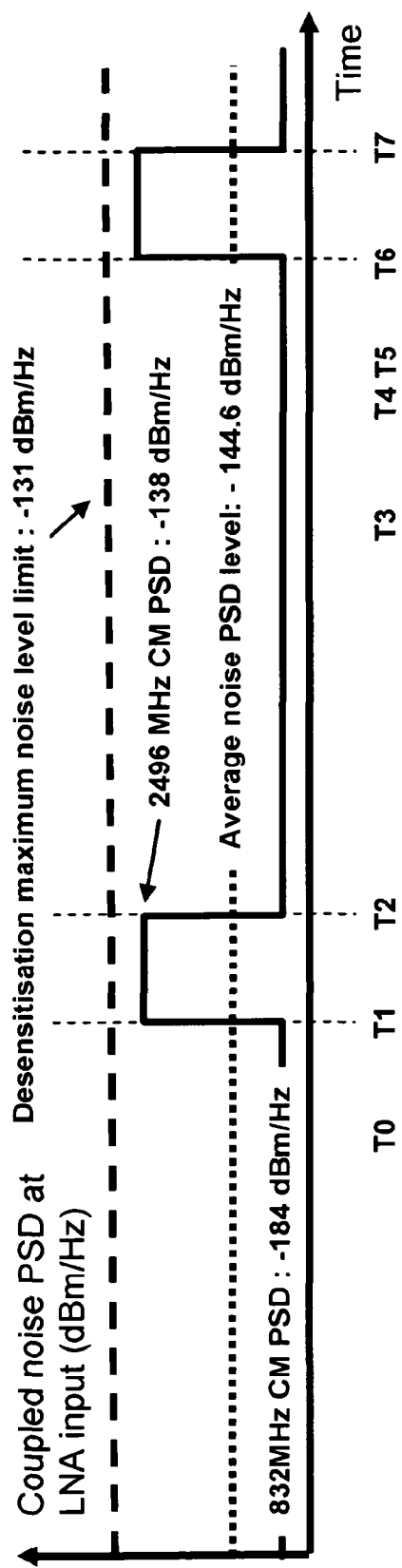
FIG. 15 shows the use of the 832 MHz-2496 MHz clock rate hopping for resolving GPS desensitization issue

FIG. 15 shows the use of the 832 MHz-2496 MHz clock rate hopping for resolving GPS desensitization issue.

In that figure, the following assumptions were made:
required maximum noise in GPS band: −131 dBm/Hz (−184 dBm/Hz+53 dB pin to pin isolation),
FIFO size sufficient to hold LS mode over 2 LTE timeslots, ie., 1 ms,
Time is LS mode is held until FIFO size reaches 90% of its maximum size,
Out of the 832 and 2496 Mbit/s, 26 Mbit/s is reserved to implement control and ACK/NACK messages,
Slew rate control is used at 832 Mbit/s to lower the 2nd lobe CM PSD as shown in FIG. 10, ie. at −184 dBm/Hz in GPS band,
From FIG. 11, the 2496 Mbit/s CM PSD is assumed to be −138 dBm/Hz under realistic differential mismatches of 5% amplitude mismatch and 3% UI time delay mismatch between P & N lines.
Target GPS maximum noise of −184 dBm/Hz,
512 bit long payloads, Second Embodiment It has been disclosed above that the invention is well adapted to the control of the digital interface when one particular band of frequency is being considered.

Ideally, the LS speed is determined in order to correspond to one optimum frequency minimizing the effects of the noise on the highly sensitive LNAs (victims).

However, we will now consider a situation of simultaneous receiving in two different bands, for instance in the GSM band and simultaneously in the GPS band (1575 MHz).

In that particular case, the second frequency operating at a higher rate has to be determined in order to avoid a too much spoiling of the highly sensitive GPS band.

In the second embodiment the hopping process is controlled so as to minimize the effects of the noise on the two different set of LNAs.

Different method may be considered.

In one embodiment, the hopping process is determined in order to take into account the power of the signal received from the base station. More practically, during simultaneous GPS and RF band receiving, the frequency hopping is set in order to reduce the impact on the RF communication when the signal shows to be weak. On the contrary, as the user is coming closer to the base station—thus improving the strength of the signal—the frequency hopping is controlled in order to avoid too much disturbance on the GPS receiver.

There is therefore provided a frequency hopping mechanism, between two (and even more) frequencies which is controlled in a contextual basis in accordance with the practical signal being received.

While the invention has been disclosed with details in relation with the mobile wireless communications, it should be clear that the process and apparatus for controlling the data rate on the digital interface is not restricted to such applications.

Indeed, the process may also be used for other interfaces between Integrated circuits containing RF blocks and electronic circuits, such as camera interface, display interfaces etc. . . .

The invention claimed is:

1. A method of controlling switching of a data rate at a digital interface exchanging data between a Radio Frequency (RF) receiver circuit and a digital circuit, wherein the RF circuit processes signals that occupy a first known frequency band, the method comprising the steps of:
setting by default the data rate to the low speed rate such that noise produced by said digital interface when using said low speed rate has a power spectral density comprising a first lobe that has a peak located at a frequency that is lower than a lowest frequency in the first known frequency band of the signals processed in said RF receiver circuit;
storing the data into a first-in-first-out buffer (FIFO) and monitoring how much capacity of said FIFO is being used; and
whenever the capacity usage level of said FIFO reaches a first predetermined threshold value, then controlling said digital interface to switch to a high speed rate in order to reduce the capacity usage level of said FIFO.

2. The method of claim 1, comprising controlling said digital interface to switch to said low speed rate when the capacity usage level satisfies a predetermined condition.

3. The method of claim 1, wherein whenever the capacity usage level of said FIFO reaches a second predetermined threshold value, then controlling said digital interface to switch to the low speed rate.

4. The method of claim 1, further comprising applying slew rate control on said digital interface.

5. The method of claim 1, wherein said low speed data rate is set to 832 Mbit/s.

6. The method of claim 5 wherein said high speed data rate is set to 2496 Mbit/s.

7. The method of claim 1 further comprising controlling said digital interface to switch between operation at said low speed rate and said high speed rate, and wherein the RF receiver circuit simultaneously receives signals occupying at least the first known frequency band and a further frequency band, and wherein the switching of the data rate between said low speed and high speed data rates is further controlled in response to monitoring of strength of the signal on one of the frequency bands.

8. The method of claim 1, further comprising controlling said digital interface to switch between operation at said low speed rate, said high speed rate, and a medium speed rate, wherein operation of said digital interface at said medium speed rate causes noise produced by said digital interface to have a power spectral density comprising a first lobe that is lower than a lowest frequency in a second known frequency band of signals being processed in said RF circuit.

9. The method of claim 8, further comprising monitoring a strength of the signals occupying the first known frequency band, and
wherein said switching between operation of said digital interface at said low speed, said high speed, and said medium speed rates is based, at least in part, on whether the monitored strength of the signals occupying the first known frequency band satisfies a predetermined relationship with a signal strength threshold.

10. The method of claim 1, wherein the power spectral density of the noise produced by said digital interface operating at the low speed rate comprises a second lobe that has a peak located at a frequency that is lower than a lowest frequency in a further known frequency band of signals processed in said RF receiver circuit.

11. The method of claim 1, comprising using said digital interface between the RF receiver circuit and a display or camera digital circuit.

12. A control circuit for controlling the switching of the data rate at a digital interface exchanging data between a Radio Frequency (RF) receiver circuit and a digital circuit, wherein the RF receiver circuit processes signals that occupy a first known frequency band, the control circuit comprising:
a first-in-first-out buffer (FIFO) for receiving data;
circuitry configured to set by default the data rate to a low speed rate such that noise produced by said digital interface has a power spectral density comprising a first lobe that has a peak located at a frequency that is lower than a lowest frequency in the first known frequency band of the signals processed in said RF receiver circuit;
circuitry configured to store the data into said FIFO and to monitor how much capacity of said FIFO is being used; and
circuitry configured to control said digital interface to switch to a high speed rate whenever the capacity usage level of said FIFO reaches a predetermined threshold value in order to reduce the capacity usage level of said FIFO.

13. The control circuit of claim 12 comprising circuitry configured to control said digital interface to switch to the low speed rate when the capacity usage level satisfies a predetermined condition.

14. The control circuit of claim 12 comprising circuitry configured to control said digital interface to switch to the low speed rate whenever the capacity usage level of said FIFO reaches a second predetermined threshold value.

15. The control circuit of claim 12, further comprising circuitry configured to apply slew rate control on said digital interface.

16. The control circuit of claim 12, wherein the RF receiver circuit processes simultaneously received signals occupying at least the first known frequency band and a further frequency band, and
wherein the control circuit further comprises:
circuitry configured to monitor a strength of the signal on one of the frequency bands; and
circuitry configured to switch said digital interface between operation at said low speed rate and said high speed rate depending on the monitored strength.

17. The control circuit according to claim 12, further comprising circuitry configured to switch said digital interface between operation at said low speed rate, said high speed rate, and a medium speed rate, wherein operation of said digital interface at said medium speed rate causes noise produced by said digital interface to have a power spectral density comprising a first lobe that is lower than a lowest frequency in a second known frequency band of signals being processed in said RF receiver circuit.

18. The control circuit of claim 17, further comprising signal strength monitoring circuitry configured to monitor strength of the signals occupying the first known frequency band,
and wherein said switching between operation of said digital interface at said low speed, said high speed, and said medium speed rates is based, at least in part, on whether the monitored strength of the signals occupying the first known frequency band satisfies a predetermined relationship with a signal strength threshold.

19. The control circuit of claim 12, wherein the power spectral density of the noise produced by said digital interface operating at the low speed rate comprises a second lobe that has a peak located at a frequency that is lower than a lowest frequency in a further known frequency band of signals processed in said RF receiver circuit.

20. The control circuit according to claim 12, wherein the control circuit is embodied as part of a mobile communication device.

* * * * *

UNITED STATES PATENT AND TRADEMARK OFFICE
CERTIFICATE OF CORRECTION

PATENT NO. : 8,437,725 B2  
APPLICATION NO. : 13/142594  
DATED : May 7, 2013  
INVENTOR(S) : Brunel et al.

Page 1 of 1

It is certified that error appears in the above-identified patent and that said Letters Patent is hereby corrected as shown below:

In the Specification

Col. 1, line 56: change "to tremendously increases ..." to --tremendously increases ...--

Col. 12, line 52: change "with a 102% is duty ..." to --with a 102% duty--

Signed and Sealed this  
Twenty-seventh Day of August, 2013

Teresa Stanek Rea  
*Acting Director of the United States Patent and Trademark Office*